United States Patent [19]
Gerace et al.

[11] Patent Number: 5,880,218
[45] Date of Patent: Mar. 9, 1999

[54] COMPOUNDED POLYMERIC COMPOSITIONS UTILIZING PROCESSED PAINT SLUDGE AS A REPLACEMENT FOR POLYMERIC COMPONENTS

[75] Inventors: Michael Joseph Gerace, Dayton; Yasminka S. Landaburu, Yellow Springs; Sevilla C. Gamboa, Huber Heights, all of Ohio

[73] Assignee: Aster, Inc., Fairborn, Ohio

[21] Appl. No.: 558,008

[22] Filed: Nov. 13, 1995

[51] Int. Cl.$^6$ ............................. C08L 27/06; C08L 95/00
[52] U.S. Cl. ...................... 525/239; 525/232; 525/233; 524/59; 524/296; 524/567; 524/569; 524/572; 524/574; 524/575; 106/281.1; 106/283
[58] Field of Search .................................... 525/232, 233, 525/239; 524/59, 569, 572, 574, 575, 296, 567; 106/281.1, 283

[56] References Cited

U.S. PATENT DOCUMENTS

| | | |
|---|---|---|
| 4,980,030 | 12/1990 | Johnson et al. . |
| 5,087,375 | 2/1992 | Weinwurm . |
| 5,092,928 | 3/1992 | Spangler . |
| 5,160,628 | 11/1992 | Gerace et al. . |
| 5,223,106 | 6/1993 | Gerace et al. . |
| 5,254,263 | 10/1993 | Gerace et al. ..................... 210/667 |
| 5,376,238 | 12/1994 | Zambory . |

FOREIGN PATENT DOCUMENTS

| | | |
|---|---|---|
| 212214 | 3/1987 | European Pat. Off. . |
| 3150718 | 6/1983 | Germany . |

*Primary Examiner*—Fred Teskin
*Attorney, Agent, or Firm*—Killworth, Gottman, Hagan & Schaeff, LLP

[57] ABSTRACT

Compounded polymeric compositions containing processed paint sludge putty as a replacement for polymeric components are provided. The paint sludge comprises from about 5 to 90% by weight of the total compounded polymeric composition and may be decatalyzed so that it contains uncured polymer for use in a variety of compositions including pressure sensitive sealants, caulking sealants, automotive sealants, polyvinyl chloride plastics, rubbers and asphalt cement coatings.

16 Claims, No Drawings

COMPOUNDED POLYMERIC COMPOSITIONS UTILIZING PROCESSED PAINT SLUDGE AS A REPLACEMENT FOR POLYMERIC COMPONENTS

BACKGROUND OF THE INVENTION

This invention relates to compounded polymeric compositions, and more particularly, it relates to the use of processed paint sludge as a polymeric component in various compounded polymeric compositions such as sealants, adhesives, plastics, rubbers and coatings.

The paint and coatings industry is a major source of chemical wastes. Paint sludges are produced in the automotive industry, appliance industry, metal fabricating industry and during the painting of wood products, outdoor structures such as bridges and lamp posts, and all types of industrial equipment. For example, it is estimated that nearly 40% of the 6 gallons of paint used to produce the exterior finish on an automobile ends up as waste.

Paint sludge typically contains uncured polymer resins, pigments, curing agents, surfactants, and other minor formulation ingredients. In addition, paint sludge contains water and a variety of organic solvents. The cost and the environmental impact of disposing of paint sludge has been a source of concern in the industry. However, in recent years, several processes have been developed for converting paint sludge into useful products, thereby reducing a major source of chemical waste.

One such process is disclosed in U.S. Pat. No. 4,980,030, which includes removing a portion of the water and liquid hydrocarbons from the sludge. The high solids sludge is then heated to remove the remaining water and hydrocarbons. The heating step is also designed to cure the uncured polymeric paint resins. The process is advantageous because it reduces the volume of waste produced, and produces a powder which is somewhat easier to handle than the wet sludge.

A similar process is disclosed in U.S. Pat. No. 5,087,375, which discloses a method of heating and calcining paint sludge to form a product which may be used as a filler for sealants.

However, both U.S. Pat. No. 4,980,030 and U.S. Pat. No. 5,087,375, completely cure any uncured polymers in the paint sludge during their heating and/or calcining steps. Accordingly, the resulting product is an inert, inorganic, brittle, abrasive particulate material.

An improved process is disclosed in U.S. Pat. Nos. 5,160,628, and 5,254,263, assigned to the same assignee as the present invention, which disclose a product formed from paint sludge which may be used as a filler in sealant compositions, and which contains uncured polymer. By keeping the polymer uncured, the resulting product is soft and easily dispersible. However, this process requires that the heating temperature must not exceed 100° F. so that the polymer remains uncured.

Further, fillers are only one of several components of sealants and other related compositions, which are generally comprised of other components such as polymers and plasticizers. Such components typically comprise up to 75% or more of the total sealant composition, and polymers in particular usually account for a significant portion of the cost of sealant formulation. It would be desirable to be able use paint sludge as a replacement for one of the polymeric components in the sealants and other related compositions to reduce production costs. Accordingly, the need remains for sealant compositions and related products which utilize paint sludge as a polymeric component thereof, which are cost effective to produce, and which do not require complex processing steps.

SUMMARY OF THE INVENTION

The present invention solves those needs by providing compounded polymeric compositions such as sealants, adhesives, rubbers, and other related compositions which utilize processed paint sludge as a replacement for polymeric components contained in those compositions. The paint sludge may be a paint sludge from the automotive industry, appliance industry, metal fabricating industry or other sources. The paint sludge is treated to form a putty containing uncured polymer which may be used in a variety of compositions as a low cost replacement for more costly polymeric components such as resins, plasticizers, binders, curing agents, tackifiers, and modifiers.

According to one aspect of the present invention, a a compounded polymeric composition is provided comprising at least one polymeric component selected from the group consisting of plasticizers, binders, tackifiers, modifiers, rubbers, resins, and mixtures thereof. By "compounded polymeric composition", we mean compositions such as paints, sealants, adhesives, plastics and rubbers which are comprised of at least one of the polymeric components described above.

The compounded polymeric composition further comprises processed paint sludge putty containing uncured polymer, where the paint sludge putty is a replacement for at least a portion of the polymeric components in the composition. The paint sludge putty preferably comprises from about 5 to 90% by weight of the total compounded polymeric composition, and more preferably, from about 20 to 50% by weight.

The paint sludge putty of the present invention is preferably processed from raw sludge containing water, solvent and uncured polymer which has been agitated under a vacuum at a temperature of about 225° F. such that a portion of the water and solvent are removed from the sludge.

In one embodiment of the invention, the compounded polymeric composition comprises a heat-curable sealant including from about 10 to 90% by weight of the processed paint sludge putty, from about 10 to 20% by weight of a plasticizer, from about 1 to 10% by weight of a polyvinyl chloride resin, and from about 0.1 to 1% by weight of an adhesion promoter. In this embodiment, the polymer in the paint sludge cures upon exposure to heat.

In other embodiments of the invention, it is desirable that the polymer in the paint sludge remain uncured after incorporation in the desired compounded polymeric composition. For example, compositions such as pressure sensitive sealants and caulking sealants require a polymer component having heat stability. Rather than using low temperatures in the sludge treatment as required in U.S. Pat. Nos. 5,160,628 and 5,254,263 in order to assure that the polymer in the paint sludge remains uncured, it has been found that a decatalyzing agent may be used for that purpose. This permits use of elevated temperatures, as will be explained below, and yet assures that the polymer in the paint sludge remains uncured.

A preferred method of treating the paint sludge includes the steps of removing a portion of the water and solvent from the paint sludge by drying the sludge without curing the polymer in the sludge, and then decatalyzing the sludge by treatment with a decatalyzing agent comprising a base having a pH range from 8 to 13. By "decatalyzed", it is meant that the catalyst normally present in the paint sludge is neutralized such that the curing component in the paint sludge is not activated upon heating. Preferably, the paint sludge is treated with a base which is selected from the group consisting of diethanolamine, 2-amino-2-methyl-2-propanol, diiospropanol amine, triisopropanol amine, potassium hydroxide, and sodium hydroxide. The base preferably comprises from about 0.1 to 10% by weight of the total raw sludge composition.

In another embodiment of the invention, the compounded polymeric composition comprises a pressure sensitive sealant including from about 5 to 75% by weight of the decatalyzed paint sludge putty, from about 10–20% by weight of a tackifier, from about 5–15% by weight of a rubber elastomer, and from about 1–10% by weight of a thixotrope. The rubber elastomer is preferably selected from the group consisting of butyl rubber, styrene-butadiene, EPDM rubber, and mixtures thereof.

In yet another embodiment of the invention, the compounded polymeric composition comprises a caulking sealant comprising from about 15 to 75% by weight of the decatalyzed paint sludge putty, from about 5 to 10% by weight chlorobutyl rubber, from about 5 to 15% by weight of an ester resin and from about 20 to 35% by weight of a solvent.

In yet another embodiment of the invention, the compounded polymeric composition comprises an automotive paintable seam sealer including from about 10 to 75% by weight of the decatalyzed paint sludge putty, from about 15 to 30% by weight of a plasticizer, from about 10 to 25% by weight of a polyvinyl chloride resin, and from about 1 to 5% by weight of an adhesion promoter.

In yet another embodiment of the invention, the compounded polymeric composition comprises an automotive underbody sealer including from about 10 to 75% by weight of the decatalyzed paint sludge putty, from about 15 to 25% by weight calcium carbonate, from about 20 to 30% by weight of a plasticizer, from about 20 to 30% of a polyvinyl chloride resin, and from about 0.1 to 1.0% of an adhesion promoter.

In yet another embodiment of the invention, the compounded polymeric composition comprises an automotive body shop adhesive including from 5 to 50% by weight of the decatalyzed paint sludge putty, from about 1 to 5% by weight nitrile rubber, from about 15 to 20% calcium carbonate, from about 20 to 30% by weight of a plasticizer, from about 15 to 30% by weight of a polyvinyl chloride resin, and from about 1 to 5% by weight of a curing agent.

In yet another embodiment of the invention, the compounded polymeric composition comprises a flexible polyvinyl chloride plastic including from about 5 to 75% by weight decatalyzed paint sludge putty, from about 15 to 30% by weight of a plasticizer, from about 10 to 35% by weight calcium carbonate, and from about 20 to 40% by weight polyvinyl chloride resin.

In yet another embodiment of the invention, the compounded polymeric composition comprises a cured butyl rubber including from about 5 to 30% by weight paint sludge putty, from about 15 to 30% by weight butyl rubber, from about 15 to 30% by weight chlorobutyl rubber, from about 25 to 35% by weight carbon black, and from about 5 to 15% by weight paraffinic process oil.

In another embodiment of the invention, a modified asphalt cement coating is provided which is formed from the decatalyzed processed paint sludge putty. The coating comprises from about 2 to 50% by weight paint sludge putty and from about 60 to 95% by weight asphalt cement.

Because the paint sludge of the present invention may be used as an inexpensive replacement for more expensive polymeric components, a variety of compounded polymeric compositions may be produced at low cost. Accordingly, it is an object of the present invention to provide compounded polymeric compositions such as sealants, adhesives, plastics, rubbers and coatings utilizing paint sludge as a replacement for polymeric components. It is a further object of the invention to provide a method of treating paint sludge in which the polymer in the sludge remains uncured. These, and other objects and advantages of the present invention will become apparent to those skilled in the art from a reading of the following detailed description of the preferred embodiments and the appended claims.

DETAILED DESCRIPTION OF THE PREFERRED EMBODIMENTS

Raw paint sludge collected from many types of operations including the automobile industry, the appliance industry, the metal fabricating industry, etc. may be used in the present invention. For example, the paint sludge may be derived from a high solids enamel paint containing acrylic and polyester paint resins, or it may be derived from a low solids polyester enamel. For purposes of the present invention, paint sludge having a volatiles content of approximately 10–80% by weight is preferred.

The paint sludge putty may be produced by any method which is capable of removing water from paint sludge without curing the polymers in the paint sludge. The preferred process of the present invention is to remove a portion of water from a 50% solids mixture of paint sludge, water, and solvent by agitation under low shear conditions. The sludge is then heated under vacuum at about 225° F. until the sludge has a solids content of from about 70–80%. It should be noted that in the time it takes for the water to be removed (about half an hour), the paint sludge will not cure. However, exposure to temperatures of up to 250° F. for over 24 hours will cause the curing system in the paint sludge to activate. Accordingly, the processed paint sludge putty described above is useful in applications where heat sensitivity is desired, such as in heat or chemical curable sealant compositions where the paint sludge putty can also function as a curing agent.

However, if the sludge putty is to be used in compositions such as pressure sensitive sealants, caulking sealants, and related products, the paint sludge putty is preferably further treated so that a non-curing sludge putty is formed. It has been found that by adding a base to the treated sludge, a decatalyzed or non-curing sludge putty results. The base functions to neutralize the sulfonic acid catalyst present in the paint sludge, which, under normal conditions, would activate the melamine cure system present in the paint upon exposure to heat. A number of organic and inorganic bases are suitable for use in the present invention including diethanolamine, 2-amino-2-methyl-2 propanol, diisopropanol amine, triisopropanol amine, potassium hydroxide and sodium hydroxide. A preferred inorganic base is potassium hydroxide. The base is preferably added in an amount from 0.1 to 10% of the total raw sludge composition,, and more preferably, about 1%.

After water and solvent removal and optional decatalyzation, the processed paint sludge is preferably discharged into blocks in putty form. Prior to mixing with other components for forming the desired compounded polymeric composition, the sludge is warmed by mild heating so that it softens.

One example of a compounded polymeric composition which utilizes the paint sludge putty of the present invention is a heat-curable sealant composition. The heat-curable sealant composition preferably comprises about 10 to 90% by weight of the processed paint sludge putty, from about 1 to 10% by weight of a polyvinyl chloride resin, from about 10 to 20% by weight of a polymeric plasticizer, and from about 0.1 to 1% by weight of an adhesion promoter. In this composition, the paint sludge putty functions as a polymeric plasticizer, as an elastomeric modifier, and as a curing agent. In addition, the use of paint sludge also eliminates the need for additional fillers or extenders in the composition.

Suitable polyvinyl chloride resins for use in the heat-curable sealant composition include homopolymers of vinyl chloride as well as copolymers of vinyl chloride with copolymerizable vinyl addition monomers. Blends of several different polyvinyl chloride resins may also be used. Preferred polyvinyl chloride resins for use in the heat-curable sealant composition are Vestolit 7031, a homopolymer dispersion resin, Vestolit B 7070, a copolymer dispersion resin, and Vestolit 7091, a copolymer dispersion resin, all available from A. Schulman, Inc. Another suitable resin is P1361, a homopolymer dispersion resin available from Huels Corp.

Suitable polymeric plasticizers for use in the heat-curable sealant composition include diisodecyl phthalate, available from Chem Central under the designation DIDP, aromatic hydrocarbons available from Akrochem Corp. under the designation Plasticizer LN, alkyl phthalates, available from Exxon Chemical under the designations Santicizer 160 or L9P, and a texanol ester, available from Huls America under the designation Nuoplaz Z 1046.

The adhesion promoter used in the heat-curable sealant formulation may include organosilanes, acrylic monomers, epoxy resins, organic peroxides, and isocyanates. Preferred adhesion promoters are Euretek 554, a polyaminamide available from Shell Chemical, Desmodur BL3175A, a blocked aliphatic polyisocyanate resin available from Miles Inc., cumene hydroperoxide, available from Atochem North, Silane A-189, an organosilane ester available from OSI Specialties, Inc., and Ageflex TMPTA, an acrylic monomer available from CPS Chemical.

The heat-curable sealant composition described above is a vinyl plastisol-based composition useful as an automobile sealant. Vinyl plastisols are excellent as sealants over all areas of the automobile body assembly line as they flow readily at room temperature to fill seams and body joints. In addition, they adhere well to oily steel and primed metal surfaces, and can be painted over without leaching or causing other cosmetic problems.

A compounded polymeric composition which utilizes the decatalyzed paint sludge putty of the present invention is a pressure sensitive sealant. In the pressure sensitive sealant composition, the paint sludge putty functions as a plasticizer as well as a polymeric binder. This composition preferably includes from about 5 to 75% by weight of the decatalyzed paint sludge putty, from about 10–20% by weight of a tackifier, 5–15% by weight of a rubber elastomer, and 1–10% by weight of a thixotrope.

The rubber elastomer may comprise butyl rubbers, styrene-butadiene block copolymers, EPDM rubbers, or acrylic polymers. Preferred for use as the rubber elastomer is a butyl rubber, available from Exxon Chemical under the designation Butyl 065. Suitable tackifiers include polybutene, available from Amoco under the designation H-1500.

Suitable thixotropes include carbon black, available from AKZO Chemical under the designation Ketjenblack EC 300, precipitated calcium carbonate, available from H. M. Royal Inc. under the designation Hakuenka CC, fumed silica, available from Cabot Corp. under the designations Cab-o-sil M-5 and Cab-o-sil TS-720.

The resulting pressure sensitive sealants may be used extensively in industrial bonding applications because of their ease of application and convenience of use. The composition may be supplied in the form a butyl tape which may be used to seal automobile windshields, back lites, and quarter windows to car bodies. In addition, the composition may be used in curtainwall construction for buildings, to seal overlap joints in metal buildings, and for telephone cable sealing applications.

In another embodiment of the invention, the compounded polymeric composition may be a caulking sealant comprising from about 15 to 75% of the decatalyzed paint sludge putty, from about 5 to 10% chlorobutyl rubber, from about 20 to 35% by weight of a solvent, and from about 5 to 15% by weight of an ester resin. In this composition, the paint sludge putty functions as a polymeric binder and a tackifier.

A preferred chlorobutyl rubber is available from Exxon Chemical under the designation 1066. A preferred ester resin is available from Hercules under the designation Stabellite #10. Suitable solvents for use in the composition include xylene, butyl alcohol, methyl alcohol, light naphtha, toluene, and isobutyl alcohol.

The caulking sealant composition is similar in composition to the pressure sensitive sealant except that the sealant is reduced to a low viscosity by the addition of a solvent. Because such sealants are of relatively low viscosity, they are easily applied to a joint or on a surface, and after the solvent evaporates, a solid resilient mass remains.

In another embodiment of the invention, the compounded polymeric composition comprises an automotive paintable seam sealer including from 10 to 75% by weight decatalyzed paint sludge putty, from about 15 to 30% by weight of a plasticizer, from about 20 to 25% by weight of a polyvinyl chloride resin, and from about 1 to 5% by weight of an adhesion promoter. A preferred plasticizer for use in this composition is diisononylphthalate, available from Exxon. Preferred polyvinyl chloride resins include Vestolit 7031, available from A. Schulman, Inc. (homopolymer) and Oxy 52, available from Occidental Chemical (copolymer). A preferred adhesion promoter is Euretek 554, available from Shell.

In another embodiment of the invention, the compounded polymeric composition comprises an automotive underbody sealer comprising from about 10 to 75% by weight decatalyzed paint sludge putty, from about 15 to 25% by weight of a thixotrope, from about 20 to 30% by weight of a plasticizer, from about 20 to 30% by weight of a polyvinyl chloride resin, and from about 0.1 to 1.0% of an adhesion promoter. Preferably, the thixotrope comprises ground calcium carbonate, available from H. M. Royal under the designation Camel-cal, and precipitated calcium carbonate, available from H. M. Royal under the designation Hakuenka CC. A preferred plasticizer is diisodecylphthalate available from Chem Central. The preferred polyvinyl chloride resin is Vestolit 7031.

In another embodiment of the invention, the compounded polymeric composition may be an automotive body shop adhesive comprising from 5 to 50% by weight of the decatalyzed paint sludge putty, from about 1 to 5% by weight nitrile rubber, from about 15 to 20% by weight of a thixotrope, from about 20 to 30% by weight of a plasticizer, from about 15 to 30% by weight of a polyvinyl chloride resin, and from about 1 to 5% by weight of a curing agent. A preferred nitrile rubber is available from Enichem under the designation Europrene 2860. A preferred thixotrope is precipitated calcium carbonate, available from H. M. Royal under the designation Hakuenka CC.

In yet another embodiment of the invention, the compounded polymeric composition comprises a flexible polyvinyl chloride plastic comprising from about 5 to 75% by weight paint sludge putty, from about 15 to 30% by weight of a plasticizer, from about 10 to 35% by weight of a thixotrope, and from about 20 to 40% by weight polyvinyl chloride resin. The thixotrope preferably comprises calcium carbonate, available from H. M. Royal under the designation Camel-cal.

In yet another embodiment of the invention, the compounded polymeric composition may be a cured butyl rubber comprising from about 5 to 30% by weight decatalyzed paint sludge putty, from about 15 to 30% by weight butyl rubber, from about 15 to 30% by weight chlorobutyl rubber, from about 25 to 35% by weight of a thixotrope, and from about 5 to 5% by weight paraffinic process oil. Butyl rubber and chlorobutyl rubber are available from Exxon Chemical under the designations Butyl 268 and Chlorbutyl 1068. A preferred thixotrope is carbon black, available from Sid Richardson Carbon under the designations N550 and N774. A preferred processing oil is available from R. E. Carroll under the designation Sunpar 115.

A modified asphalt cement coating may also be formed from the decatalyzed paint sludge putty of the present invention. The coating comprises from about 2 to 50% by weight paint sludge and from about 60 to 95% by weight asphalt cement. The preferred asphalt cement is available from Republic Asphalt under the designation AC-20.

In order that the invention may be more readily understood, reference is made to the following examples which are intended to illustrate the invention, but not limit the scope thereof.

EXAMPLE 1

A paint sludge putty was prepared in accordance with the present invention by adding 2,000 grams of raw paint sludge (50% solids content) in a two-gallon double planetary mixer. The sludge was agitated under low speed for 5 minutes. The resulting sludge was heated to approximately 225° F. by means of the steam in the mixer jacket. In addition, a vacuum of 25 In.Hg. was applied and maintained over the sludge as a means of removing the remaining water from the sludge.

EXAMPLE 2

A sludge putty was prepared as in Example 1 which was decatalyzed by adding 80 grams of diethanol amine dissolved with mild heating in 36 grams of diisodecyl phthalate. After five minutes of mixing, heating was discontinued and the batch was discharged.

The melt index of the resulting putty was measured before and after heat aging for 24 hours at 250° F. There was no change in the measured melt index.

EXAMPLE 3

A pressure sensitive sealant composition was prepared using the paint sludge putty of Example 2 by adding 100 grams of butyl rubber (Butyl 065, available from Exxon Chemical), 73 grams of carbon black (Statex MRG, available from Columbian), and 55 grams of a polybutene tackifier (H-1500 available from Amoco) to a one-gallon laboratory Baker Perkins sigma blade mixer. These ingredients were mixed for about 30 minutes until they formed a continuous mass. 455 grams of paint sludge putty was then added and mixed for about 5 minutes, followed by successive additions of 188 g. atapulgite clay (Minugel PC available from Floridin Co.), 18 g. fumed silica (Cab-o-sil M-5 available from Cabot) 91 g. talc (Mistron Vapor available from Cypress), and 100 g. polybutene. The resulting compound was extruded into a ⅜" square configuration tape. The tape showed excellent adhesion to glass and exhibited a cone penetration of 5 mm (100 g. weight at 78° F.), and a compression deflection of 45 psi.

EXAMPLE 4

A caulking sealant composition was prepared using the paint sludge putty formed in Example 2 by adding 570 grams of the paint sludge putty, 75 g. chlorobutyl rubber (1066 available from Exxon), 10 g. fumed silica, and 110 g. Stabellite ester resin (Stabellite #10 available from Hercules) to a one-gallon Baker Perkins sigma blade mixer. The ingredients were mixed for 15 minutes, then successive additions of 9.5 g. xylene, 25 g. butyl alcohol, 55 g. methyl alcohol, 45 g. light naphtha, 10 g. toluene, and 15 g. isobutyl alcohol were added to the mixture with 5 minutes of mixing in between additions.

The resulting sealant was deaired under a vacuum of 25 In.Hg, which yielded an air-free sealant having excellent adhesion to glass, aluminum, concrete and galvanized steel after heat aging at 175° F. for 24 hours. The sealant exhibited a viscosity of 880,000 cps.

EXAMPLE 5

A heat curable sealant composition was prepared using the paint sludge putty of Example 1 of the present invention in which 510 g. of the processed paint sludge putty and 18 g. polyvinyl chloride were mixed for 5 minutes in a one-gallon Baker Perkins sigma blade mixer. This was followed by the addition of 120 g. of diisodecyl phthalate with 10 minutes of mixing.

The following components were then successively added to the composition: 31 g. of an acrylic monomer (Ageflex TMPTA, available from CPS Chemical), 5 g. of organosilane (Silane A-189 available from OSI Specialties, Inc.), 4 g. of cumene hydroperoxide (available from Atochem North), 36 g. of epoxy resin (Epon R 828 available from Shell Chemical), 15 g. of dicyandiamide, and 2 g. of tetrahydrophthalic anhydride.

After curing at 325° F. for 20 minutes, the resulting adhesive showed excellent adhesion to hot dip galvanized steel, cold rolled steel, and PPG ED-11 electrocoated steel. The sealant had a viscosity of 1,460,000 cps.

EXAMPLE 6

An automotive paintable seam sealer composition was prepared using the paint sludge putty of Example 2 which was warmed at 200° F. for 10 minutes. 250 grams of the paint sludge putty and 50 grams of diisononylphthalate were added to a Kitchen-aid mixer and mixed for 4 minutes at medium speed.

Successive additions of 85.5 grams of a homopolymer PVC resin (Vestolit 7031, available from Huels Corp.), 28 grams of a copolymer PVC resin (Oxy 521, available from Oxy Chem), 9 grams of a water scavenger (Calcium Oxide, available from Mississippi Lime Company), 4.5 grams carbon black (Ketjen Black EC-300J, available from Akzo), 9 grams of an adhesion promoter (Euretek 554, available from Shell) and 64 grams of diisononylphthalate were added to the mixture and mixed for 2 minutes at medium speed after each addition.

After curing for 20 minutes at 325° F., the sealer showed excellent adhesion to E-coated metal substrates, elongation between 180%–200%, tensile strength between 400 PSI–500 PSI, shear strength of 400 PSI to 500 PSI with 100% cohesive failure and satisfactory paintability with high solids enamel automotive paint.

EXAMPLE 7

An automotive underbody sealer was prepared using the paint sludge putty prepared in Example 2 which was warmed at 200° F. for 10 minutes. 121 grams of the paint sludge putty was then added to 79 grams of ground calcium carbonate (Camel-cal available from H. M. Royal), 26.5 grams of precipitated calcium carbonate (Hakuenka CC, available from H. M. Royal), and 100 grams of diisodecylphthalate, and then mixed for 8 minutes at high speed.

Successive additions of 131.5 grams of PVC homopolymer dispersion resin (Vestolit 7031, available from Huels Corp.), 8 grams of calcium oxide, 26.5 grams diisodecylphthalate, 2.5 grams of an adhesion promoter (Euretek 554, available from Shell) and 5 grams of mineral spirits were added to the initial mixture and mixed for 8 minutes at medium speed. After a 30 minute bake at 275° F., the sealer showed excellent adhesion to an E-coated substrate, 90% elongation, tensile strength of 300 PSI and shear adhesion of 250 PSI with 100% cohesive failure.

EXAMPLE 8

An automotive body shop adhesive composition was prepared using the paint sludge putty prepared in Example 2. A mixture of 600 grams nitrile rubber (Europrene 2860, available from Enichem) and 700 grams of diisodecylphthalate were mixed in an AMK sigma blade mixer and heated until a rubber mass was formed. 2350 grams of paint sludge putty was then added and mixed with the other ingredients for about 30 minutes until a continuous mass was formed.

In a Kitchen-Aid mixer, 73 grams of the above compound was stirred while successively adding 95 grams of precipitated calcium carbonate (Hakuenka CC, available from H. M. Royal), 31.5 grams of clay (HC100 available from Huber), 61 grams doiisodecylphthalate and 25.5 grams of a blowing system prepared by mixing 9 grams of azocarbonamide (Ficel ACS P4, available from Schering Berlin Polymers), 9 grams of zinc oxide (Kadox 911, available from Zinc Corporation of America) and 7.5 grams of diisodecylphthalate. These components were mixed at high speed for 5 minutes.

After the blowing system was added, the compound was mixed for 10 minutes at medium speed followed by the addition of 120 grams of a PVC homopolymer dispersion resin (Vestolit 1361K available from Huels), and 54.5 grams of diisodecylphthalate. These ingredients were mixed for another 10 minutes at medium speed. The following components were then successively added to the composition: 10 grams of an acrylic monomer (Ageflex TMPTA, available from CPS Chemical), 2.5 grams of an organosilane (M8550, available from Huls), 1.0 grams of cumene hydroperoxide (available from Atochem North), 17.5 grams of an epoxy resin (Epon R 828 available from Shell Chemical), 7.5 grams of dicyandiamide and 1.0 grams of tetrahydrophthalic anhydride and mixed at medium speed for 5 minutes.

After curing for 20 minutes at 325° F. the resulting expandable vinyl adhesive had a vertical rise of 60%, compression deflection of 150 PSI and a shear adhesion of 275 PSI with 100% cohesive failure to oily galvanized steel.

EXAMPLE 9

A modified asphalt cement coating composition was prepared using the paint sludge putty of Example 2 by adding 1000 grams of asphalt cement (AC-20 available from Republic Asphalt) and 80 grams of paint sludge putty in a two gallon double planetary mixer. The mixture was then heated to approximately 225° F. by means of the steam in the mixer jacket and mixed for about 15 minutes until it was homogeneous.

The melt index and penetration of the samples were tested before and after heat aging for 24 hours at 300° F. The sample containing the paint sludge was found to have increased heat resistance properties. The percent change in melt index and penetration after heat aging of the asphalt with no paint sludge putty was 40% and 18.8% respectively, while the samples containing paint sludge putty showed a change of 26.9% and 13.8%. All other properties tested remained the same including cold flex and rolling ball tack.

EXAMPLE 10

A flexible PVC plastic was prepared using the paint sludge putty of Example 2 with the ingredients listed in Table 1 below.

A portion of polymeric plasticizer (up to 75%) was removed and replaced by paint sludge putty. For each percent of polymeric plasticizer to be replaced, one percent of the paint sludge putty was added. One percent of the filler was replaced with one percent of the monomeric plasticizer to obtain the desired viscosity.

500 gram batches of these compounds were prepared using a Kitchen-Aid mixer. The polymeric plasticizer and paint sludge putty were mixed together until homogeneous. The mixer was then added with the rest of the ingredients and mixed for 5 minutes.

TABLE 1

|  | % Replacement Compounds | | | |
|---|---|---|---|---|
|  | (1) 0% | (2) 25% | (3) 50% | (4) 75% |
| Polymeric Plasticizer[1] | 82.5 | 62.0 | 41.3 | 20.5 |
| Paint sludge putty | 0 | 20.5 | 41.3 | 62.0 |
| Diisononylphthalate | 82.5 | 95.0 | 107.5 | 120.0 |
| calcium carbonate[2] | 165.0 | 152.5 | 140.0 | 127.5 |
| calcium oxide | 5.0 | 5.0 | 5.0 | 5.0 |
| Homopolymer PVC resin[3] | 165.0 | 165.0 | 165.0 | 165.0 |

[1]Plast-Hall 550 from C.P. Hal
[2]Camel-cal from H.M. Royal
[3]Vestolit 7030 from A. Schulman The tensile strength and % elongations of the different formulas were then tested, and the results are shown below in Table 2.

TABLE 2

| | Compounds | | | |
|---|---|---|---|---|
| | (1) | (2) | (3) | (4) |
| Tensile Strength (PSI) | 780 | 786 | 790 | 796 |
| % Elongation | 228 | 226 | 225 | 224 |

EXAMPLE 11

A cured butyl rubber was prepared using the paint sludge putty of Example 2. 200 grams of Butyl 268 and 200 grams of Chlorbutyl 1068 (available from Exxon Chemical) were added to a mixer which was heated by the steam in the mixer jacket. These components were mixed together until the mixture was crumbly. 40 grams of N550, 220 grams N774 carbon black (available from Sid Richardson Carbon Company) and 68 grams of Sunpar 115 processing oil (available from R. E. Carroll) were then alternately added while mixing continuously until all the ingredients were fluxed together. 68 grams of paint sludge, 4 grams of stearic acid (available from R. E. Carroll), 20 grams of zinc oxide (available from Zinc Corporation of America), 2.0 grams of sulfur (available from Aldrich), 1 gram of TMTD (available from Elastochem) and 8 grams MBTS (available from Uniroyal) and all the ingredients were mixed for 30 minutes.

Sample batches were also prepared without paint sludge putty. Samples prepared with and without paint sludge putty were then cured for 40 minutes at 350° F. The sample containing the paint sludge putty showed a tensile strength of 500 psi and elongation of 780% while the sample which did not contain paint sludge putty showed a tensile strength of 280 psi and elongation of 650%.

It will be obvious to those skilled in the art that various changes may be made without departing from the scope of the invention which is not to be considered limited to what is described in the specification.

What is claimed is:

1. A compounded polymeric composition comprising:
   a) at least one polymeric component selected from the group consisting of plasticizers, binders, tackifiers, modifiers, rubbers, resins, and mixtures thereof, and
   b) processed paint sludge putty containing uncured polymer, wherein said processed paint sludge putty is a replacement for at least a portion of said at least one polymeric component, wherein said paint sludge putty has been processed from raw paint sludge containing water, solvent and uncured polymer which has been agitated under a vacuum at a temperature of about 225° F. such that a portion of the water and solvent is removed from said sludge; wherein said processed paint sludge putty comprises from about 20 to 50% by weight of the total compounded polymeric composition.

2. A compounded polymeric composition comprising:
   a) at least one polymeric component selected from the group consisting of plasticizers, binders, tackifiers, modifiers, rubbers, resins, and mixtures thereof, and
   b) processed paint sludge putty containing uncured polymer, wherein said processed paint sludge is a replacement for at least a portion of said at least one polymeric component, wherein said paint sludge putty has been decatalyzed by treatment with from about 0.1 to 10% of a base having a pH range of from 8–13.

3. The compounded polymeric composition of claim 2 wherein said base is selected from the group consisting of diethanolamine, 2-amino-2-methyl-2-propanol, diisopropanol amine, triisopropanol amine, potassium hydroxide, and sodium hydroxide.

4. The compounded polymeric composition of claim 1 comprising a heat-curable sealant including from about 10 to 90% by weight of said processed paint sludge putty, 1 to 10% by weight of a polyvinyl chloride resin, from about 10 to 20% by weight of a plasticizer, and from about 0.1 to 1.0% by weight of an adhesion promoter.

5. The compounded polymeric composition of claim 2 comprising a pressure sensitive sealant including from about 5 to 75% by weight of said decatalyzed paint sludge putty, from about 5 to 15% by weight of a rubber elastomer, from about 1 to 10% by weight of a thixotrope, and from about 10 to 20% by weight of a tackifier.

6. The compounded polymeric composition of claim 5 wherein said rubber elastomer is selected from the group consisting of butyl rubber, styrene-butadiene, EPDM rubber, and mixtures thereof.

7. The compounded polymeric composition of claim 2 comprising a caulking sealant including from about 15 to 75% by weight of said decatalyzed paint sludge putty, from about 5 to 10% by weight chlorobutyl rubber, from 5 to 15% by weight of an ester resin and from about 20 to 35% by weight of a solvent.

8. The compounded polymeric composition of claim 2 comprising an automotive paintable seam sealer including from about 10 to 75% by weight of said paint sludge putty, from about 15 to 30% by weight of a plasticizer, from about 10 to 25% by weight of a polyvinyl chloride resin, and from about 1 to 5% by weight of an adhesion promoter.

9. The compounded polymeric composition of claim 2 comprising an automotive underbody sealer including from about 10 to 75% by weight of said decatalyzed paint sludge putty, from about 15 to 25% by weight of a thixotrope, from about 20 to 30% by weight of a plasticizer, from about 20 to 30% by weight of a polyvinyl chloride resin, and from about 0.1 to 1.0% by weight of an adhesion promoter.

10. The compounded polymeric composition of claim 2 comprising an automotive body shop adhesive including from 5 to 50% by weight of said decatalyzed paint sludge putty, from about 1 to 5% by weight nitrile rubber, from about 15 to 20% by weight of a thixotrope, from about 20 to 30% by weight of a plasticizer, from about 15 to 30% by weight of a polyvinyl chloride resin, and from about 1 to 5% by weight of a curing agent.

11. The compounded polymeric composition of claim 2 comprising a flexible polyvinyl chloride plastic including from about 5 to 75% by weight of said decatalyzed paint sludge putty, from about 15 to 30% by weight of a plasticizer, from about 10 to 35% by weight of a thixotrope, and from about 20 to 40% by weight polyvinyl chloride resin.

12. The compounded polymeric composition of claim 2 comprising a cured butyl rubber including from about 5 to 30% by weight of said decatalyzed paint sludge putty, from about 15 to 30% by weight butyl rubber, from about 15 to 30% by weight chlorobutyl, from about 25 to 35% by weight of a thixotrope, and from about 5 to 15% by weight paraffinic process oil.

13. The compounded polymeric composition of claim 2 wherein said processed paint sludge putty comprises from about 5 to 90% by weight of the total compounded polymeric composition.

14. The compounded polymeric composition of claim 2 wherein said processed paint sludge putty comprises from about 20 to 50% by weight of the total compounded polymeric composition.

15. A modified asphalt cement coating formed from processed paint sludge putty containing uncured polymer, wherein said paint sludge putty has been decatalyzed with a base, said coating comprising about 8% by weight paint sludge putty and about 92% by weight asphalt cement.

16. A compounded polymeric composition comprising:

a) at least one polymeric component selected from the group consisting of plasticizers, binders, tackifiers, modifiers, rubbers, resins, and mixtures thereof, and b) processed paint sludge putty containing uncured polymer, wherein said processed paint sludge is a replacement for at least a portion of said at least one polymeric component, wherein said processed paint sludge putty comprises from about 20 to 50% by weight of the total compounded polymeric composition.

* * * * *